(12) United States Patent
Sato

(10) Patent No.: US 8,949,047 B2
(45) Date of Patent: Feb. 3, 2015

(54) MAGNETIC SENSOR DEVICE AND ELECTRONIC COMPASS APPARATUS

(75) Inventor: Hideki Sato, Hamamatsu (JP)

(73) Assignee: Yamaha Corporation, Hamamatsu-Shi, Shizuoka-Ken (JP)

( * ) Notice: Subject to any disclaimer, the term of this patent is extended or adjusted under 35 U.S.C. 154(b) by 563 days.

(21) Appl. No.: 13/160,468

(22) Filed: Jun. 14, 2011

(65) Prior Publication Data

US 2011/0313690 A1  Dec. 22, 2011

(30) Foreign Application Priority Data

Jun. 16, 2010  (JP) ................................ 2010-137303

(51) Int. Cl.
  *G06F 19/00* (2011.01)
  *G01C 17/38* (2006.01)
  *G01C 17/28* (2006.01)

(52) U.S. Cl.
  CPC ............... *G01C 17/38* (2013.01); *G01C 17/28* (2013.01)
  USPC ............ 702/57; 702/150; 324/251; 324/252; 33/256

(58) Field of Classification Search
  USPC ............................... 701/224; 342/140; 33/356
  See application file for complete search history.

(56) References Cited

U.S. PATENT DOCUMENTS 7,177,779 B2 *  2/2007  Hikida et al. ................ 702/150
7,210,236 B2    5/2007  Sato et al
7,237,343 B2 *  7/2007  Sato et al. ...................... 33/356
2006/0032064 A1  2/2006  Sato et al.
2009/0201152 A1 *  8/2009  Karr et al. .................. 340/545.6

FOREIGN PATENT DOCUMENTS

| CN | 1734236 A   | 2/2006  |
|----|-------------|---------|
| CN | 200986484 Y | 12/2007 |
| EP | 1605232 A2  | 12/2005 |
| EP | 1772704 A1  | 4/2007  |

(Continued)

OTHER PUBLICATIONS

Chinese Patent Office, first Office Action issued Sep. 4, 2013 for corresponding Application No. CN 201110166034.4 (with English translation).

(Continued)

*Primary Examiner* — Jonathan C Teixeira Moffat
*Assistant Examiner* — Hien Vo
(74) *Attorney, Agent, or Firm* — Dickstein Shapiro LLP

(57) ABSTRACT

A magnetic sensor device is connectable to a data processing device and is a circuitry physically separate from the data processing device. In the magnetic sensor device, a detection unit detects magnetic field and outputs analog magnetic data representing the detected magnetic field. A conversion unit converts the analog magnetic data into digital magnetic data. A buffer memory has a capacity capable of storing a statistical population formed of a given number of the digital magnetic data. A control unit responds to a first trigger for operating the detection unit to successively output the analog magnetic data, then successively receives the digital magnetic data from the conversion unit in correspondence to the analog magnetic data, and accumulates the received digital magnetic data in the buffer memory to thereby form the statistical population. The control unit further responds to a second trigger for providing the data processing device with the statistical population accumulated in the buffer memory and formed of the given number of the digital magnetic data.

19 Claims, 5 Drawing Sheets

(56) References Cited

FOREIGN PATENT DOCUMENTS

| | | |
|---|---|---|
| EP | 1832889 A2 | 9/2007 |
| JP | 2007-240270 A | 9/2007 |
| KR | 2007-0079345 A | 8/2007 |

OTHER PUBLICATIONS

Korean Intellectual Property Office Notice of Preliminary Rejection issued Mar. 21, 2013 for Korean Patent Application No. 10-2011-58001.

* cited by examiner

MAGNETIC SENSOR DEVICE AND ELECTRONIC COMPASS APPARATUS

BACKGROUND OF THE INVENTION

1. Technical Field of the Invention

The present invention relates to a magnetic sensor device and an electronic compass apparatus, and more particularly to calibration of a magnetic sensor.

2. Description of the Related Art

An electronic compass for detecting the Earth's magnetic field using a magnetic sensor and for measuring an orientation is conventionally provided in an in-vehicle navigation system, a mobile phone, or the like. When specifying the direction or magnitude of the Earth's magnetic field based on outputs of the magnetic sensor, it is necessary to perform calibration, which is a process for correcting the outputs of the magnetic sensor, in order to negate measurement errors caused by magnetization. A control value of this correction process is referred to as an "offset". The offset is vector data indicating a magnetic field component caused by magnetization of a vehicle, a mobile phone, or the like detected by the magnetic sensor. Such measurement errors are negated by subtracting the offset from magnetic data output from the magnetic sensor. When a three dimensional (3D) magnetic sensor is used, it is possible to calculate the offset by obtaining the center of a sphere on which a set of magnetic data is distributed. Regarding an example of the prior art, reference is made to Japanese Patent Application Publication No. 2007-240270.

In order to maintain a correct offset, it is necessary to always activate an electronic compass control program and to always store a set of magnetic data as a statistical population for deriving the offset in a memory. However, if the electronic compass control program is always running, there is a problem in that excessive power is consumed to activate large-size electronic circuits including a CPU and memory. If the electronic compass control program is activated at the request of the user, it is possible to suppress power consumption. However, there is a problem in that it is not possible to measure a correct orientation when needed by the user since it takes a time to obtain a correct offset after the electronic compass control program is activated.

SUMMARY OF THE INVENTION

The invention has been made to overcome the above problems and it is an object of the invention to realize an electronic compass apparatus and a magnetic sensor device that can measure a correct orientation when needed by a user. It is a further object of the invention to realize an electronic compass apparatus and a magnetic sensor device that can suppress power consumption while efficiently acquiring magnetic data for measurement of orientation.

In order to achieve the above object, according to a first aspect of the invention, there is provided a magnetic sensor device being connectable to a data processing device and being a circuitry physically separate from a circuitry of the data processing device. The magnetic sensor device comprises: a detection unit that detects magnetic field and outputs analog magnetic data representing the detected magnetic field; a conversion unit that converts the analog magnetic data into digital magnetic data; a buffer memory that has a capacity capable of storing a statistical population formed of a given number of the digital magnetic data; and a control unit that responds to a first trigger for operating the detection unit to successively output the analog magnetic data, then successively receives the digital magnetic data from the conversion unit in correspondence to the analog magnetic data, and accumulates the received digital magnetic data in the buffer memory to thereby form the statistical population. The control unit further responds to a second trigger for providing the data processing device with the statistical population accumulated in the buffer memory and formed of the given number of the digital magnetic data.

Preferably, the buffer memory selectively stores the digital magnetic data that satisfies a given criteria and therefore suitable as a member of the statistical population. In such a case, the control unit checks whether or not the digital magnetic data satisfies the given criteria based on an index associated to a position of the digital magnetic data in a coordinate system defined for the magnetic sensor device.

Preferably, the control unit responds to the first trigger that is a request for sampling the analog magnetic data issued by the data processing device, and also responds to the second trigger that is a request for providing the statistical population issued by the data processing device.

Preferably, the magnetic sensor device further comprises a communication unit that is connected to the data processing device for receiving therefrom the requests and for transmitting the statistical population formed of the given number of the digital magnetic data to the data processing device.

In order to achieve the above object, according to a second aspect of the invention, there is provided a magnetic sensor device that outputs digital magnetic data to a data processing device that derives an offset of the digital magnetic data based on a statistical population formed of a plurality of digital magnetic data and that also derives an orientation based on the digital magnetic data and the offset. The magnetic sensor device comprises: a detection unit that detects magnetic field at intervals of a sampling period and outputs analog magnetic data representing the detected magnetic field; a conversion unit that converts the analog magnetic data into the digital magnetic data; a buffer memory that stores the statistical population; and a control unit that determines whether or not the digital magnetic data outputted from the conversion unit is to be stored as a member of the statistical population in the buffer memory according to a distance between the digital magnetic data outputted from the conversion unit and the digital magnetic data stored in the buffer memory as the member of the statistical population, thereby selectively accumulating the digital magnetic data to form the statistical population in the buffer memory, and that reads the statistical population from the buffer memory upon request from the data processing device and provides the read statistical population to the data processing device.

According to this magnetic sensor device, since a statistical population of digital magnetic data for calibration can be stored in the magnetic sensor device, the data processing device can acquire a statistical population of digital magnetic data required for calibration when needed by the user without always activating an electronic compass control program. Thus, according to the invention, it is possible to achieve an electronic compass that can measure a correct orientation when needed by the user while suppressing power consumption. In addition, it is possible to efficiently store a statistical population of digital magnetic data required to derive a correct offset in a low-capacity buffer memory since a statistical population of digital magnetic data required for calibration is selected based on the distance between digital magnetic data items. Here, it is assumed that the control unit includes a sequencer. The distance between digital magnetic data items is a distance in a 3-dimensional space with three coordinates corresponding to 3-axis magnetic field.

Preferably, the magnetic sensor device is deactivated when the plurality of the magnetic data forming the statistical population stored in the buffer memory reaches a predetermined number. According to this magnetic sensor device, it is possible to further suppress power consumption of the electronic compass.

Preferably, the detection unit varies the sampling period such that the sampling period is reduced when the digital magnetic data is stored as a member of the statistical population in the buffer memory and is extended when the digital magnetic data is not stored as a member of the statistical population in the buffer memory. According to this magnetic sensor device, it is possible to further suppress power consumption of the electronic compass.

In order to achieve the above further object, according to a third aspect of the invention, there is provided a magnetic sensor device being connectable to a data processing device and being a circuitry physically separate from the data processing device. The magnetic sensor device comprises: a detection unit that detects magnetic field and outputs analog magnetic data representing the detected magnetic field; a conversion unit that converts the analog magnetic data into digital magnetic data; a control unit that responds to a trigger for setting the circuitry to a storage mode for operating the detection unit to successively output the analog magnetic data, then successively receives the digital magnetic data from the conversion unit in correspondence to the analog magnetic data, and accumulates the received digital magnetic data in a buffer memory, the control unit further setting the circuitry to an idle mode when a number of the digital magnetic data accumulated in the buffer memory reaches a predetermined number; and a power unit that supplies electric power to the detection unit for enabling detection of the magnetic field, wherein supply of the electric power from the power unit to the detection unit is stopped when the circuitry is set to the idle mode.

Preferably, the control unit selectively accumulates the digital magnetic data that satisfies a given criteria. In such a case, the control unit checks whether or not the digital magnetic data satisfies the given criteria based on an index associated to a position of the digital magnetic data in a coordinate system defined for the magnetic sensor device.

Preferably, the power unit starts supply of the electric power to the detection unit in response to the trigger.

In order to achieve the above further object, according to a fourth aspect of the invention, there is provided a magnetic sensor device being connectable to a data processing device and being a circuitry physically separate from the data processing device. The magnetic sensor device comprises: a detection unit that detects magnetic field and outputs analog magnetic data representing the detected magnetic field; a conversion unit that converts the analog magnetic data into digital magnetic data; a control unit that responds to a trigger for setting the circuitry to a storage mode for operating the detection unit to successively output the analog magnetic data, then successively receives the digital magnetic data from the conversion unit in correspondence to the analog magnetic data, and accumulates the received digital magnetic data in a buffer memory, the control unit further setting the circuitry to an idle mode when a number of the digital magnetic data accumulated in the buffer memory reaches a predetermined number; and a clock unit that supplies a clock signal to the conversion unit for enabling conversion from the analog magnetic data to the digital magnetic data and supplies another clock signal to the control unit for enabling operation thereof, wherein supply of the clock signals from the clock unit to the conversion unit and to the control unit is stopped when the circuitry is set to the idle mode.

Preferably, the control unit selectively accumulates the digital magnetic data that satisfies a given criteria. In such a case, the control unit checks whether or not the digital magnetic data satisfies the given criteria based on an index associated to a position of the digital magnetic data in a coordinate system defined for the magnetic sensor device.

Preferably, the clock unit starts supply of the clock signals to the conversion unit and to the control unit in response to the trigger.

In accordance with the first and second aspects of the invention, the magnetic sensor device is provided with a buffer memory having a capacity capable of storing at least a statistical population formed of a given number of digital magnetic data. By such a construction, the magnetic data can be stored in the buffer memory without passing through the data processing device (processor in a communication terminal apparatus). Consequently, it is possible to provisionally accumulate the given number of the magnetic data in the magnetic sensor device before the data processing device in the terminal apparatus executes an electronic compass program or before the data processing device performs calibration of the electronic compass. Thus, it is possible to instantly measure an accurate orientation at timing when the user requests orientation information.

In accordance with the third and fourth aspects of the invention, when the control unit in the magnetic sensor device sets the circuitry to the storage mode in response to the first trigger, the control unit successively accumulates the digital magnetic data in the buffer memory. When the digital magnetic data accumulated in the buffer memory reach a predetermined number, the control unit sets the circuitry of the magnetic sensor device to the idle mode. Under the idle mode, the control unit stops supply of the electric power to the detection unit from the power unit and stop supply of clock signals to the conversion unit and the control unit from the clock unit. Such a construction can efficiently suppress consumption of the electric power in the magnetic sensor device.

DETAILED DESCRIPTION OF THE INVENTION

Figure 1:
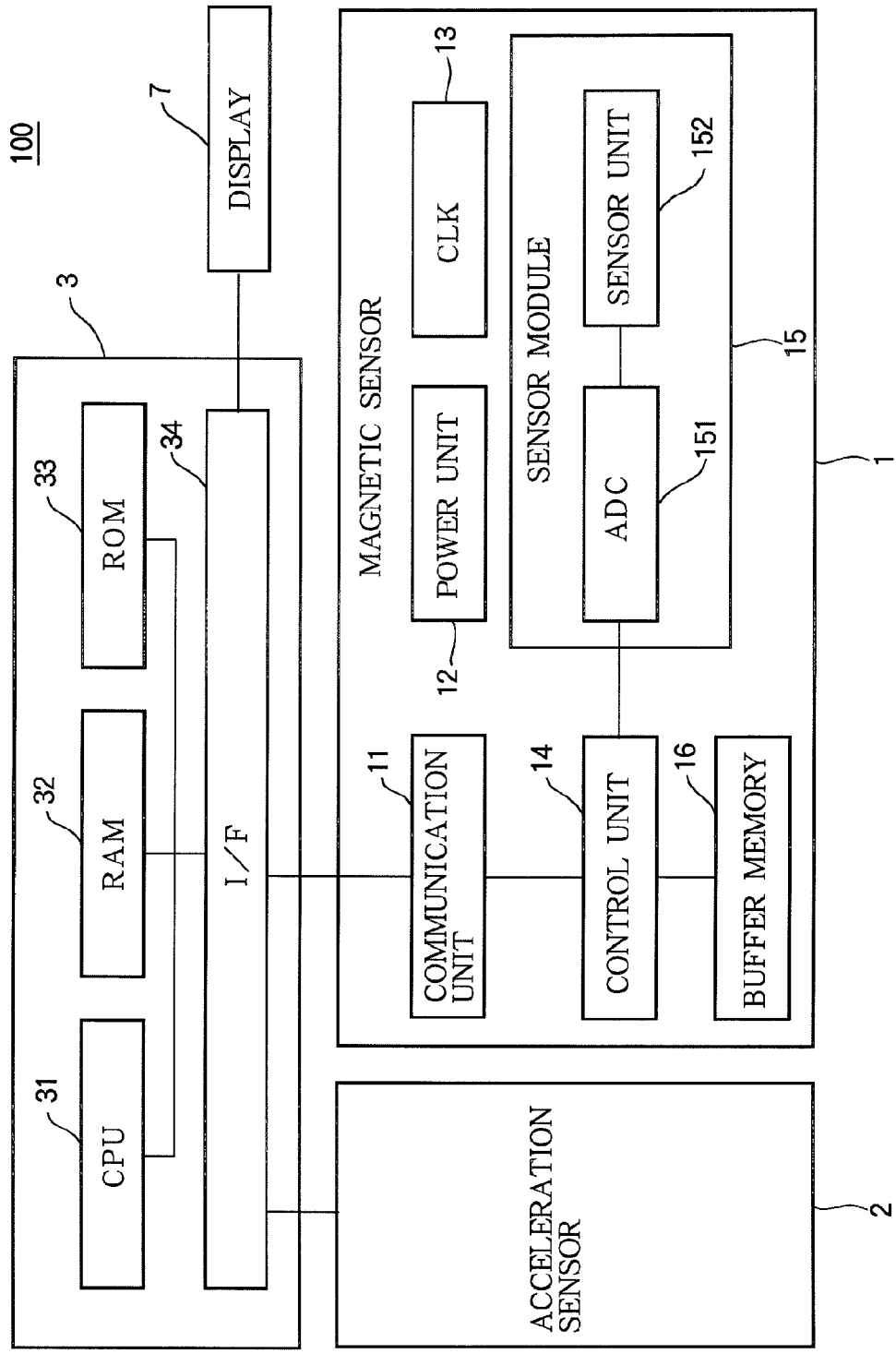
FIG. 1 is a block diagram of an embodiment of the invention.

Embodiments of the invention will now be described with reference to the accompanying drawings. Corresponding elements in each figure will be denoted by like reference numerals and a redundant description thereof will be omitted.

1. First Embodiment

FIG. 1 is a block diagram illustrating an electronic compass apparatus according to an embodiment of the invention. The electronic compass 100 includes a processor 3 (digital processing device), a 3-axis magnetic sensor 1 (magnetic sensor device), an acceleration sensor 2, and a display 7. The processor 3 is a data processing device which includes a CPU 31, a RAM 32, a ROM 33, and an interface 34. The magnetic sensor 1, the acceleration sensor 2, and the display 7 are connected to the interface 34 to constitute the electronic compass and are controlled by the processor 3. The magnetic sensor 1 is a device that outputs digital magnetic data to the processor 3. The processor 3 derives an offset of digital magnetic data based on a plurality of digital magnetic data and derives an orientation based on the digital magnetic data and the offset. The derived orientation is displayed on the display 7. The CPU 31 implements these functions of the processor 3 by executing an electronic compass program stored in the ROM 33. In the following description, it is assumed that a plurality of digital magnetic data, based on which an offset for calibration is derived, is a statistical population.

The magnetic sensor 1 is an integrated circuitry formed of a semiconductor chip that includes a communication unit 11, a power unit 12, a clock unit 13, a control unit 14, a sensor module 15, and a buffer memory 16. The sensor module 15 includes an Analog to Digital Converter (ADC) 151 (conversion unit) and a sensor unit 152. The sensor unit 152 includes three one-dimensional (1D) magnetic sensors, which detect 3-axis magnetic components of external magnetic field (magnetism), and a selector. The sensor unit 152 outputs analog magnetic data representing 3-axis magnetic components of magnetic field (geomagnetism) in a time division manner through the selector. Each 1-dimensional magnetic sensor (1-axis magnetic sensor, not shown) may be a magnetic resistance element, a Hall element, or the like. Here, any type of 1-dimensional magnetic sensor having directionality may be used as the 1-dimensional magnetic sensor. The ADC 151 converts analog magnetic data output from the sensor unit 152 into digital magnetic data. The analog magnetic data is data that represents 3-axis magnetic components using analog signals. The control unit 14 includes a register group and a logic circuit. The buffer memory 16 is a low-capacity storage circuit for storing a plurality of digital magnetic data items that is selected as a statistical population by the control unit 14. The communication unit 11 acquires a command from a bus and writes the command to a register in the control unit 14 and also outputs digital magnetic data output from the control unit 14 to the bus. The clock unit 13 is a circuit that provides a clock signal to digital circuits among a variety of circuits included in the magnetic sensor 1. A set of the control unit 14 and the communication unit 11 may be called as "logic circuit".

The power unit 12 supplies power to a variety of analog circuits and digital circuits included in the magnetic sensor 1. The sensor unit 152 and the ADC 151 in the magnetic sensor 1 are partially formed of analog circuits. The remaining parts of the magnetic sensor are formed of digital circuits. Power supply from the power unit 12 to each of the analog and digital circuits is individually controlled by the control unit 14. Operation modes of the magnetic sensor 1 include an idle mode (rest mode), a storage mode (accumulation mode), and an output mode. In the idle mode, power supply to the analog circuits is cut off and provision of a clock signal from the clock unit 13 to the digital circuits is stopped.

Figure 2:
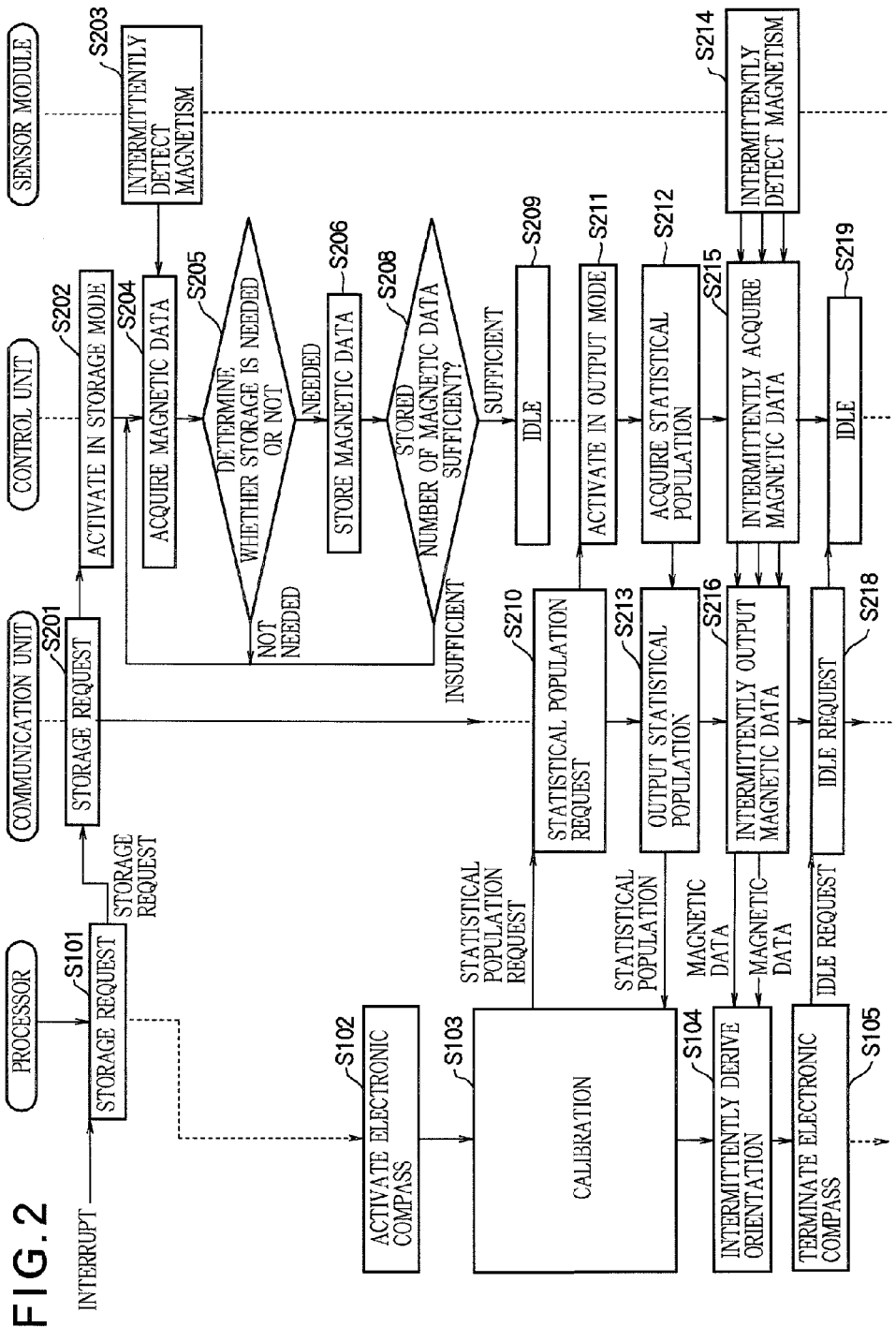
FIG. 2 is a sequence chart of an embodiment of the invention.

FIG. 2 is a sequence chart illustrating operation of the electronic compass 100. Functions of the electronic compass 100 will now be described in detail with reference to FIG. 2. The magnetic sensor 1 is activated upon transitioning from the idle mode to the storage mode or the output mode.

When the processor 3 outputs a storage request as a first trigger to the magnetic sensor 1 (S101), the magnetic sensor 1 is activated in the storage mode. Specifically, when a storage request is output from the processor 3, the communication unit 11 acquires the storage request through the bus and writes the storage request to a register in the control unit 14 (S201). Then, the control unit 14 allows the clock unit 13 to start providing a clock while allowing the power unit 12 to start supplying power to the analog circuits (S202). When the acceleration sensor 2 has detected a threshold acceleration or higher acceleration or when the electronic compass 100 has received an instruction from the user, the processor 3 is triggered to output a storage request. That is, generation of an interrupt in the processor 3 may cause the processor 3 to output a storage request.

When the magnetic sensor 1 is activated in the storage mode, the control unit 14 allows the sensor module 15 to intermittently detect magnetic field by intermittently activating the sensor unit 152 and the ADC 151 at intervals of a specific period (S203) and intermittently acquires digital magnetic data (S204). Specifically, each time a counter in the control unit 14 counts up to a preset value while only both the counter in the control unit 14 and the clock unit 13 in the magnetic sensor 1 are kept running, the sensor module 15 is activated for a very short time to store digital magnetic data in a register of the control unit 14.

When the control unit 14 has acquired a digital magnetic data item, the control unit 14 determines whether or not to store the acquired digital magnetic data item as a statistical population element in the buffer memory 16 (S205) by checking whether the acquired digital magnetic data satisfies a given criteria. Specifically, the control unit 14 determines whether or not the digital magnetic data item acquired from the sensor module 15 is to be stored as a member of statistical population according to a distance in the coordinate system of the compass space between the acquired digital magnetic data item and a digital magnetic data item that has been stored as a statistical population element in the buffer memory 16. The stored digital magnetic data item used to determine the distance which is to be compared with a threshold may be a digital magnetic data item that has been stored last in the buffer memory 16 or may be a digital magnetic data item that is nearest to the acquired digital magnetic data from among all digital magnetic data items stored in the buffer memory 16.

Here, let $P_1(x_1, y_1, z_1)$ and $P_2(x_2, y_2, z_2)$ be two digital magnetic data items and let us define indexes $D_1$, $D_2$, and $D_3$ as follows.

$$D_1 = (x_1-x_2)^2 + (y_1-y_2)^2 + (z_1-z_2)^2$$

$$D_2 = |x_1-x_2| + |y_1-y_2| + |z_1-z_2|$$

$$D_3 = MAX(|x_1-x_2|, |y_1-y_2|, |z_1-z_2|)$$

Here, MAX (a, b, c) represents the maximum of a, b, and c.

The indexes $D_1$, $D_2$, and $D_3$ denote functions that are positively correlated with and associated to the distance between $P_1$ and $P_2$. To reduce the circuit size of the control unit 14, it is preferable that, instead of the distance between $P_1$ and $P_2$, an index $D_1$, $D_2$, or $D_3$ that is positively correlated with the distance between $P_1$ and $P_2$ in the coordinate system of the compass space be used as an index for selecting a digital magnetic data item as a member of statistical population.

Then, the digital magnetic data item acquired from the sensor module 15 is stored as a statistical population element in the buffer memory 16 when the value of the index $D_1$, $D_2$, or $D_3$ is greater than a predetermined threshold D (S206), otherwise the acquired digital magnetic data item is not stored in the buffer memory 16. As described above, by selectively storing the digital magnetic data which satisfy the predetermined criteria, it is possible to form in the buffer memory the statistical population composed of pieces of digital magnetic data which are distant from each other in the compass space. Namely, the pieces of the digital magnetic data accumulated as the statistical population are broadly distributed in the compass space for enabling accurate computation of an offset contained in the magnetic data.

When the digital magnetic data item is stored as a statistical population element in the buffer memory 16, the control unit 14 determines whether or not a sufficient number (namely given number) of statistical population elements have been stored in the buffer memory 16 (S208). That is, the control unit 14 counts the number of times a digital magnetic data item is stored in the buffer memory 16 and determines whether or not the count has reached the given number predetermined to the statistical population.

Upon determining that a sufficient number of the digital magnetic data as the statistical population have been accumulated in the buffer memory 16, the control unit 14 allows the clock unit 13 to stop providing a clock signal to the digital circuits and also turns off electric power supplied from the power unit 12 to the analog circuits. Namely, the magnetic sensor 1 is deactivated to bring the circuitry of the magnetic sensor 1 into an idle state or rest state (S209).

The above procedure is repeated from step S203 both when the acquired digital magnetic data item is not stored in the buffer memory 16 and when the number of statistical population elements is not sufficient even though the acquired digital magnetic data item is stored as a statistical population element in the buffer memory 16.

The following is a description of the output mode in which a statistical population is output from the magnetic sensor 1. For example, the processor 3 starts execution of the electronic compass program (S102). As the electronic compass program is activated, the processor 3 initiates calibration, thereby triggering the processor 3 to output a statistical population request. When the processor 3 outputs a statistical population request to the magnetic sensor 1 (S103), the magnetic sensor 1 is activated in the output mode. Specifically, when a statistical population request is output from the processor 3, the communication unit 11 acquires the statistical population request from the bus and writes the statistical population request to a register in the control unit 14 (S210). Then, the control unit 14 allows the clock unit 13 to start providing a clock while allowing the power unit 12 to supply power to the analog circuits (S211).

When the magnetic sensor 1 is activated in the output mode, the control unit 14 sequentially acquires each digital magnetic data item stored as a statistical population element from the buffer memory 16 and outputs the digital magnetic data item to the communication unit 11 (S212). Each time a digital magnetic data item is acquired, the communication unit 11 outputs the digital magnetic data item to the bus (S213). The processor 3 acquires the digital magnetic data item output to the bus by storing the digital magnetic data item in the RAM 32 at a specific address. The processor 3 performs calibration which is a process for deriving a digital magnetic data offset based on a plurality of digital magnetic data items acquired as the statistical population in the above manner. When old offset has been updated by newly derived offset through such calibration, the processor 3 is ready to derive a correct orientation based on the digital magnetic data and the offset.

In this embodiment, it is possible to derive an offset immediately after the electronic compass program is activated since statistical population of digital magnetic data has already been stored in the magnetic sensor 1 when the electronic compass program is activated. Accordingly, it is possible to derive a correct orientation immediately after the electronic compass program is activated. That is, it is possible to suppress power consumption of the processor 3 since there is no need to execute the electronic compass program simply to store statistical population during a period in which the functions of the electronic compass are not needed.

After the magnetic sensor 1 outputs a statistical population of the digital magnetic data in the output mode, the control unit 14 intermittently activates the sensor unit 152 and the ADC 151 at intervals of a specific period to intermittently detect magnetic field (S214) to intermittently acquire digital magnetic data (S215). Specifically, when the counter in the control unit 14 counts up to a preset value while only both the counter in the control unit 14 and the clock unit 13 in the magnetic sensor 1 are kept running, the sensor module 15 is activated for a very short time to store digital magnetic data in a register of the control unit 14. Each time the control unit 14 acquires a digital magnetic data item, the control unit 14 outputs the acquired digital magnetic data item to the communication unit 11. Each time a digital magnetic data item is acquired, the communication unit 11 outputs the digital magnetic data item to the bus (S216). The processor 3 acquires the digital magnetic data item output to the bus by storing the digital magnetic data item in the RAM 32 at a specific address. When the processor 3 has intermittently acquired a digital magnetic data item in this manner, the processor 3 intermittently derives an orientation based on the digital magnetic data item and the offset (S104).

When the electronic compass program is terminated, the processor 3 outputs an idle request to the communication unit 11 (S105). Upon receiving the idle request, the communication unit 11 stores the idle request in a register of the control unit 14 (S218). Upon acquiring the idle request, the control unit 14 allows the clock unit 13 to stop providing a clock to the digital circuits and also turns off power supplied from the power unit 12 to the analog circuits to deactivate the magnetic sensor 1 (S219).

Figure 3:
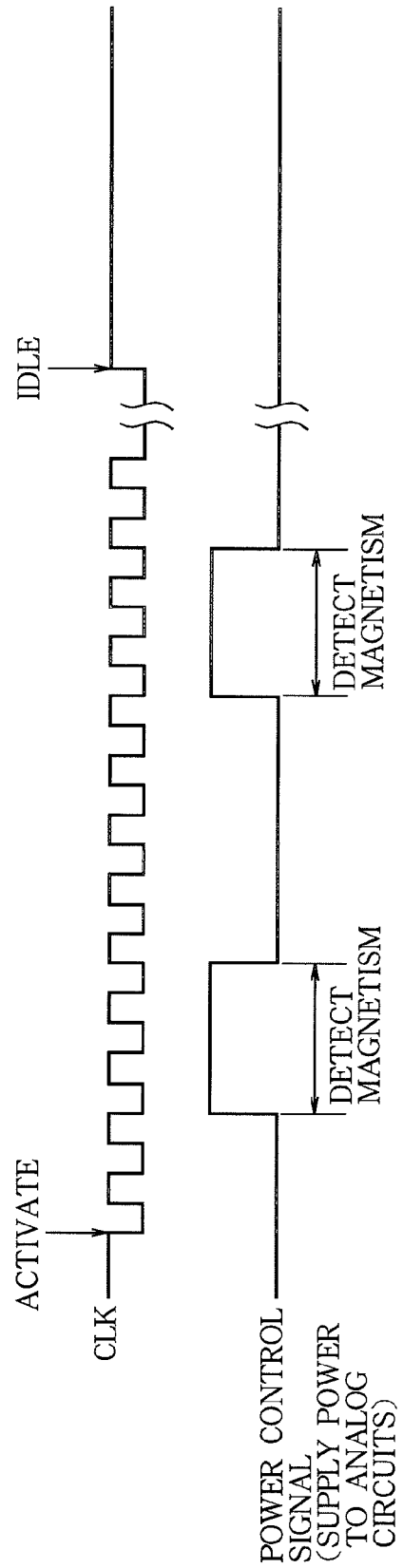
FIG. 3 is a waveform diagram of an embodiment of the invention.

FIG. 3 is a waveform diagram illustrating power consumption of the magnetic sensor 1 when the magnetic sensor 1 is in an idle state or an activated state (under the storage mode). The clock unit 13 always provides a clock to the digital circuits while the magnetic sensor 1 is activated, and stops providing a clock while the magnetic sensor 1 is idle. Power supplied to the analog circuits is controlled by a power control signal output from the control unit 14 to the power unit 12. Power is intermittently supplied from the power unit 12 to the analog circuits only when magnetic field is intermittently detected, and power supply from the power unit 12 to the analog circuits is turned off when magnetic field is not detected. Namely, the analog circuits are not continuously supplied with electric power under the operating state of the magnetic sensor, but are only supplied intermittently with the electric power. Digital circuits other than the counter of the control unit 14 are activated only both when magnetic field is detected and when a statistical population is output. Accordingly, the magnetic sensor 1 actually consumes power only both when magnetic field is detected and when a statistical population is output. Circuit size of the magnetic sensor 1 is significantly smaller than that of the processor 3. In addition, the magnetic sensor 1 becomes idle when a predetermined number of digital magnetic data have been stored. That is, in this embodiment, it is possible to significantly suppress power consumption compared to when the electronic compass program is always running to store statistical population elements in advance, since power consumption of the magnetic sensor 1 is significantly small even though the magnetic sensor 1 is activated to store statistical population elements during a period in which the electronic compass program is not running.

2. Second Embodiment

Figure 4:
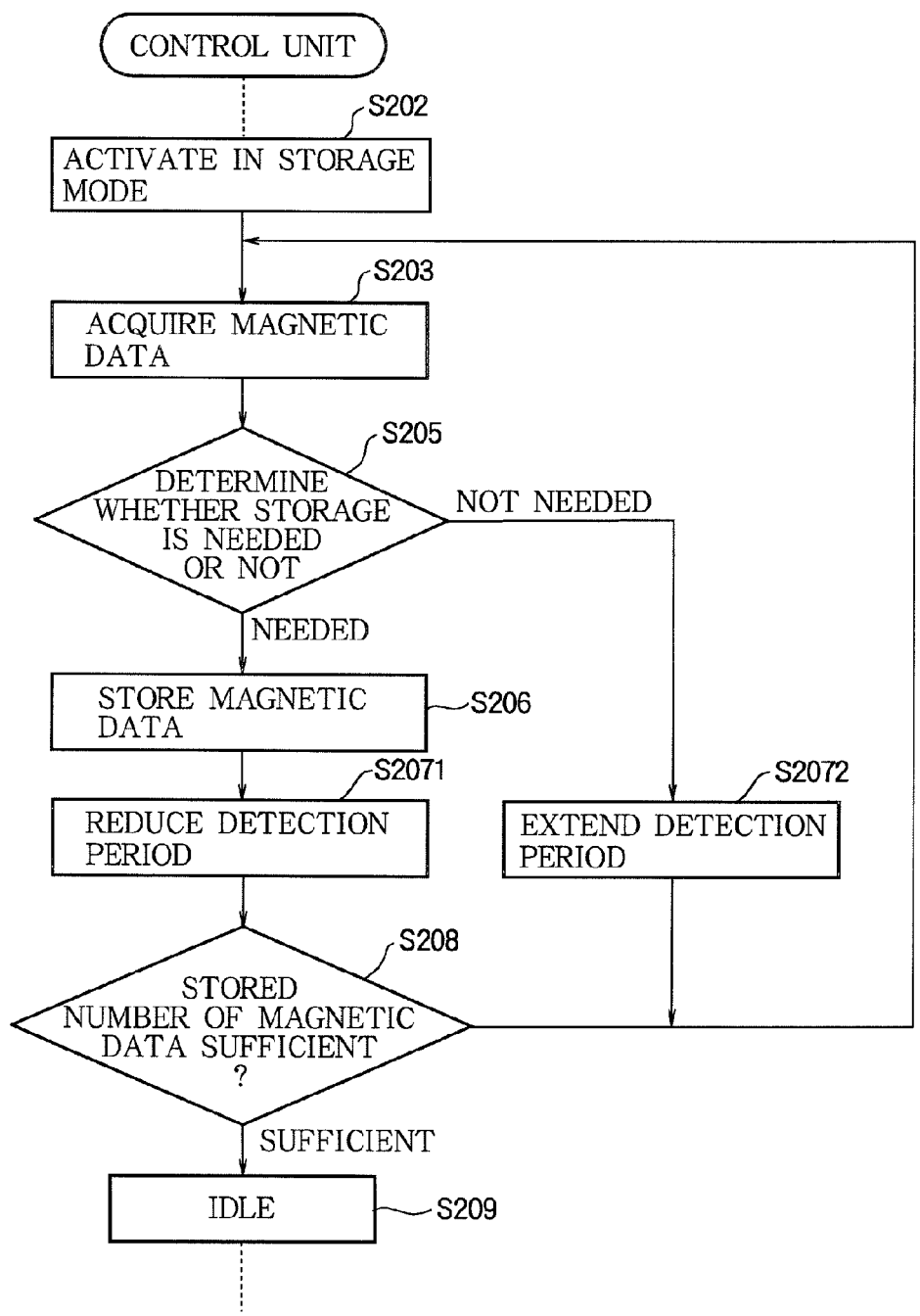
FIG. 4 is a sequence chart of another embodiment of the invention.

FIG. 4 is a sequence chart illustrating a second embodiment of the invention. As shown in FIG. 4, a magnetic field detection period may be changed according to whether or not a digital magnetic data item is stored as a statistical population element in the buffer memory 16. That is, a magnetic field detection period may be changed according to the distance between a digital magnetic data item acquired from the sensor module 15 and a digital magnetic data item already stored as a statistical population element in the buffer memory 16. Specifically, in the second embodiment, the period of magnetic field detection by the sensor module 15 is reduced when the acquired magnetic data item is stored as a statistical population element (S2071) and is extended when the acquired magnetic data item is not stored as a statistical population element (S2072).

Figure 5:
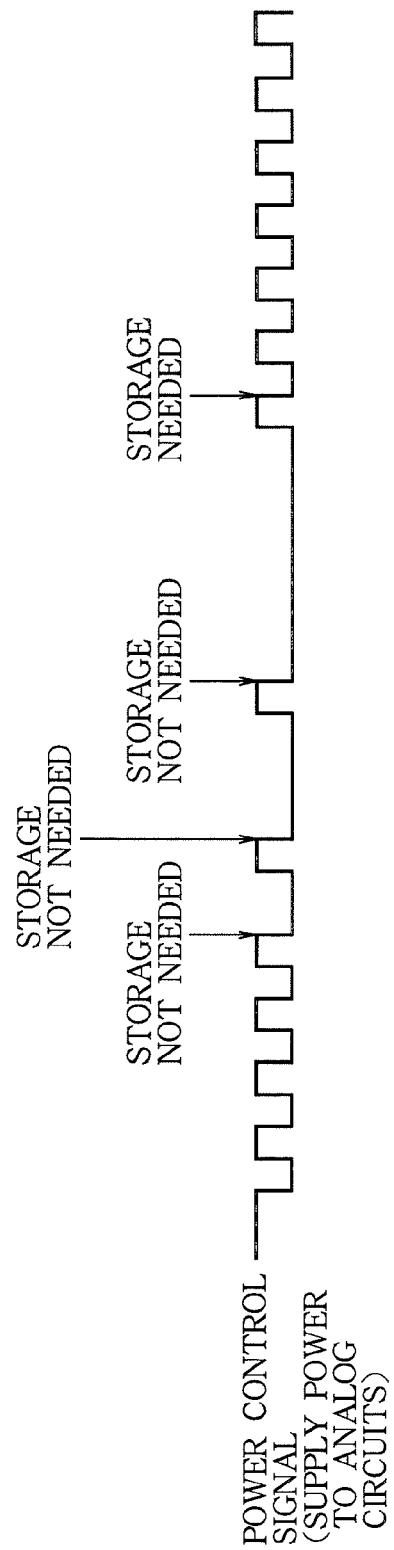
FIG. 5 is a waveform diagram of another embodiment of the invention.

If the magnetic field detection period is changed in this manner, as shown in FIG. 5, it is possible to suppress power consumed to detect magnetic field when the electronic compass 100 is not in motion (i.e., when it is determined that there is no need to store a digital magnetic data item) and it is possible to immediately store a digital magnetic data item as a statistical population element upon movement of the electronic compass.

In the case where the magnetic field detection period is extended, an upper limit of the magnetic field detection period may be set and the magnetic field detection period may be multiplied by a constant (for example, multiplied by 2) each time it is determined that a magnetic data item is not stored as a statistical population element, and may also be switched stepwise to a preset detection period each time it is determined that a magnetic data item is not stored as a statistical population element. In the case where the magnetic field detection period is reduced, the magnetic field detection period may be reset to a predetermined default value (the smallest period) when a magnetic data item is stored as a statistical population element in the buffer memory 16.

If the magnetic field detection period varies in the above manner, it is possible to sufficiently suppress power consumption of the magnetic sensor 1 without deactivating the magnetic sensor 1, and therefore a statistical population may be kept updated in a First In First Out (FIFO) or First In Last Out (FILO) manner without deactivating the magnetic sensor 1 even after a sufficient number of digital magnetic data items have been stored as statistical population elements in the buffer memory 16. That is, in the case where it is determined in step S208 that a sufficient number of digital magnetic data items have been stored as statistical population elements in the buffer memory 16, the control unit 14 returns to step S203 without performing a deactivation process in step S209, and repeats the procedure of steps S203 to S208. Here, in the case where the statistical population is updated in a FIFO manner, a fixed number of new magnetic data items are always stored in the buffer memory 16. If the communication unit 11 writes a statistical population request to a register of the control unit 14 in step S210 after it is determined in step S208 that a sufficient number of digital magnetic data have been stored in the buffer memory 16, the control unit 14 outputs digital magnetic data items that have been stored as latest statistical population elements to the communication unit 11 (S212 and S213).

3. Other Embodiments

Of course, the scope of the invention is not limited to the above embodiments and various modifications can be made without departing from the spirit of the invention. For example, the method of deriving an offset through calibration may be a known statistical method, may be a probabilistic method or may be any method developed in the future. Although the above embodiments have been described with reference to an example in which digital magnetic data is intermittently output after a statistical population is output from the magnetic sensor 1 in the output mode, a statistical population output mode and an intermittent digital magnetic data output mode may be separately defined and these two modes may then be switched under control of the processor 3. In addition, the invention may be applied to various types of electronic devices having an electronic compass function such as a mobile phone, a navigation device, and a digital camera, without being limited to electronic devices that are distributed as products that are referred to as electronic compasses.

Further, in the above embodiments, digital magnetic data acquisition is repeated upon determining that the number of digital magnetic data items stored as statistical population elements is insufficient. However, in the case where it is not possible to store a sufficient number of magnetic data items within a specific time, statistical population storage may be restarted after all digital magnetic data items that have been stored as statistical population elements in the buffer memory 16 until the specific time are discarded. This prevents a statistical population from being formed of digital magnetic data that represents magnetic field of a different location since it takes time to store the magnetic data.

Furthermore, although the magnetic sensor 1 is deactivated to await a statistical population request when a sufficient number of statistical population elements have been stored in the buffer memory 16 in the above embodiments, an interrupt signal may be output to the processor 3 through the communication unit 11 upon completion of storage of a sufficient number of statistical population elements in the buffer memory 16. Upon receiving the interrupt signal from the magnetic sensor 1, the processor 3 may temporarily activate the electronic compass program to perform calibration. This allows the offset to be corrected as needed and therefore the electronic compass program can measure a correct orientation when needed thereafter.

The present invention is applied not only to the geomagnetic sensor of 3-Axis type, but also applied to the geomagnetic sensor of 2-Axis type.

As described above, in accordance with the invention, the magnetic sensor device 1 is provided with a buffer memory 16 having a capacity capable of storing at least a statistical population formed of a given number of digital magnetic data. By such a construction, the magnetic data can be stored in the buffer memory 16 without passing through the data processing device (processor 3 in a communication terminal apparatus 100). Consequently, it is possible to provisionally accumulate the given number of the magnetic data in the magnetic sensor device 1 before the data processing device 3 in the terminal apparatus 100 executes an electronic compass program or before the data processing device 3 performs calibration of the electronic compass. Thus, it is possible to instantly measure an accurate orientation at timing when the user requests orientation information.

Further, in accordance with the invention, when the control unit 14 in the magnetic sensor device 1 sets the circuitry to the storage mode in response to the first trigger, the control unit 14 successively accumulates the digital magnetic data in the buffer memory 16. When the digital magnetic data accumulated in the buffer memory 16 reach a predetermined number, the control unit 14 sets the circuitry of the magnetic sensor device 1 to the idle mode. Under the idle mode, the control unit 14 stops supply of the electric power to the detection unit 152 from the power unit 12 and stop supply of clock signals to the conversion unit 151 and the control unit 14 from the clock unit 13. Such a construction can efficiently suppress consumption of the electric power in the magnetic sensor device 1.

What is claimed is:

1. A magnetic sensor device for detecting the earth's magnetic field, storing a statistical population of digital magnetic data indicative of the earth's magnetic field and outputting the stored statistical population to a data processing device, the magnetic sensor device comprising:
    a detector that detects a magnetic field and outputs analog magnetic data representing the detected magnetic field;
    an A/D converter for converting the analog magnetic data into digital magnetic data; and
    a memory for storing a statistical population formed of the digital magnetic data;
    the magnetic sensor device being operable in at least three modes:
    an idle mode wherein the magnetic sensor device neither detects the earth's magnetic field, stores the statistical population, nor outputs the statistical population to the data processing device;
    a storage mode wherein the magnetic sensor device detects the earth's magnetic field and stores the statistical population but does not output the statistical population to the data processing device; and
    an output mode wherein the magnetic sensor device outputs the statistical population to the data processing device but neither detects the earth's magnetic field nor stores the statistical population;
    the magnetic sensor device including a controller that:
    responds to a first trigger signal received from the data processing device while the magnetic senor device is in the idle mode to switch the magnetic sensor device to the storage mode and thereafter return the magnetic sensor device to the idle mode when a predetermined number of digital magnetic data have been stored in the memory; and
    responds to a subsequent second trigger signal received from the data processing device while the magnetic sensor device is in the idle mode, to switch the magnetic sensor device into the output mode wherein the statistical population is output to the data processing device.

2. The magnetic sensor device according to claim 1, wherein the memory selectively stores the digital magnetic data that satisfies a given criteria and therefore suitable as a member of the statistical population.

3. The magnetic sensor device according to claim 2, wherein the controller checks whether or not the digital magnetic data satisfies the given criteria based on an index associated to a position of the digital magnetic data in a coordinate system defined for the magnetic sensor device.

4. The magnetic sensor device according to claim 1, wherein the controller responds to the first trigger signal that is a request for sampling the analog magnetic data issued by the data processing device, and also responds to the second trigger signal that is a request for providing the statistical population issued by the data processing device when the same activates an electronic compass program.

5. The magnetic sensor device according to claim 4, further comprising a communication unit that is connected to the data processing device for receiving therefrom the requests and for transmitting the statistical population formed of the given number of the digital magnetic data to the data processing device.

6. The magnetic sensor device according to claim 1, wherein
    the detector detects the earth's magnetic field at intervals of a sampling period and outputs analog magnetic data representing the detected earth's magnetic field, and
    the controller determines whether or not the digital magnetic data outputted from the A/D converter is to be stored as a member of the statistical population in the memory according to distance between the digital magnetic data outputted from the A/D converter and the digital magnetic data stored in the memory as the member of the statistical population, thereby selectively accumulating the digital magnetic data to form the statistical population in the memory, and that reads the statistical population from the memory upon request from the data processing device and provides the read statistical population to the data processing device.

7. The magnetic sensor device according to claim 6, wherein the detector varies the sampling period such that the sampling period is reduced when the digital magnetic data is stored as a member of the statistical population in the memory and is extended when the digital magnetic data is not stored as a member of the statistical population in the memory.

8. An electronic compass apparatus comprising:
    the magnetic sensor device according to claim 1; and
    the data processing device connected to the magnetic sensor device.

9. The magnetic sensor device according to claim 1, wherein the detector is configured to detect earth's magnetic field and output analog magnetic data representing the detected earth's magnetic field at intervals of a specific period, and wherein the controller determines whether or not to store the digital magnetic data outputted from the A/D converter in the memory, and reduces the specific period when the controller determines to store the digital magnetic data and otherwise expands the specific period when the controller determines not to store the digital magnetic data.

10. A magnetic sensor device for detecting the earth's magnetic field, storing a statistical population of digital magnetic data indicative of the earth's magnetic field and outputting the stored statistical population to a data processing device, the magnetic sensor device comprising:
    a detector that detects a magnetic field and outputs analog magnetic data representing the detected magnetic field;
    a power supply that supplies electric power to the detector for enabling detection of the magnetic field;
    an A/D converter for converting the analog magnetic data into digital magnetic data; and
    a memory for storing a statistical population formed of the digital magnetic data;
    the magnetic sensor device being operable in at least three modes:
    an idle mode wherein the magnetic sensor device neither detects the earth's magnetic field, stores the statistical population, nor outputs the statistical population to the data processing device;
    a storage mode wherein the magnetic sensor device detects the earth's magnetic field and stores the statistical population but does not output the statistical population to the data processing device; and an output mode wherein the magnetic sensor device outputs the statistical population to the data processing device but neither detects the earth's magnetic field nor stores the statistical population;

the magnetic sensor device including a controller that:

responds to a first trigger signal received from the data processing device while the magnetic senor device is in the idle mode to switch the magnetic sensor device to the storage mode and thereafter return the magnetic sensor device to the idle mode when a predetermined number of digital magnetic data have been stored in the memory;

responds to a subsequent second trigger signal received from the data processing device while the magnetic sensor device is in the idle mode, to switch the magnetic sensor device into the output mode wherein the statistical population is output to the data processing device; and cuts off power from the power supply to the detector when the magnetic sensor device is in the idle mode.

11. The magnetic sensor device according to claim 10, wherein the controller selectively accumulates the digital magnetic data that satisfies a given criteria.

12. The magnetic sensor device according to claim 11, wherein the controller checks whether or not the digital magnetic data satisfies the given criteria based on an index associated to a position of the digital magnetic data in a coordinate system defined for the magnetic sensor device.

13. The magnetic sensor device according to claim 10, wherein the power supply starts supply of the electric power to the detector in response to the first trigger signal.

14. The magnetic sensor device according to claim 10, wherein the detector is configured to detect earth's magnetic field and output analog magnetic data representing the detected earth's magnetic field at intervals of a specific period, and wherein the controller determines whether or not to store the digital magnetic data outputted from the A/D converter in the memory, and reduces the specific period when the controller determines to store the digital magnetic data and otherwise expands the specific period when the controller determines not to store the digital magnetic data.

15. A magnetic sensor device for detecting the earth's magnetic field, storing a statistical population of digital magnetic data indicative of the earth's magnetic field and outputting the stored statistical population to a data processing device, the magnetic sensor device comprising:

a detector that detects a magnetic field and outputs analog magnetic data representing the detected magnetic field;

an A/D converter for converting the analog magnetic data into digital magnetic data;

a memory for storing a statistical population formed of the digital magnetic data; and a clock that supplies a first clock signal to the A/D converter for enabling the analog magnetic data to be converted to the digital magnetic data and a second clock signal to a controller for enabling operation thereof;

the magnetic sensor device being operable in at least three modes:

an idle mode wherein the magnetic sensor device neither detects the earth's magnetic field, stores the statistical population, nor outputs the statistical population to the data processing device;

a storage mode wherein the magnetic sensor device detects the earth's magnetic field and stores the statistical population but does not output the statistical population to the data processing device; and an output mode wherein the magnetic sensor device outputs the statistical population to the data processing device but neither detects the earth's magnetic field nor stores the statistical population;

the magnetic sensor device including the controller that:

responds to a first trigger signal received from the data processing device while the magnetic senor device is in the idle mode to switch the magnetic sensor device to the storage mode and thereafter return the magnetic sensor device to the idle mode when a predetermined number of digital magnetic data have been stored in the memory;

responds to a subsequent second trigger signal received from the data processing device while the magnetic sensor device is in the idle mode, to switch the magnetic sensor device into the output mode wherein the statistical population is output to the data processing device; and stops the supply of the clock signals to the A/D convertor and to the controller when the magnetic sensor device is in the idle mode.

16. The magnetic sensor device according to claim 15, wherein the controller selectively accumulates the digital magnetic data that satisfies a given criteria.

17. The magnetic sensor device according to claim 16, wherein the controller checks whether or not the digital magnetic data satisfies the given criteria based on an index associated to a position of the digital magnetic data in a coordinate system defined for the magnetic sensor device.

18. The magnetic sensor device according to claim 15, wherein the clock unit starts supply of the clock signals to the A/D converter and to the controller in response to the first trigger signal.

19. The magnetic sensor device according to claim 15, wherein the detector is configured to detect earth's magnetic field and output analog magnetic data representing the detected earth's magnetic field at intervals of a specific period, and wherein the controller determines whether or not to store the digital magnetic data outputted from the A/D converter in the memory, and reduces the specific period when the controller determines to store the digital magnetic data and otherwise expands the specific period when the controller determines not to store the digital magnetic data.

* * * * *